(12) United States Patent
Swarna et al.

(10) Patent No.: US 9,424,138 B2
(45) Date of Patent: Aug. 23, 2016

(54) CHECKPOINTING A COMPUTER HARDWARE ARCHITECTURE STATE USING A STACK OR QUEUE

(71) Applicant: NVIDIA Corporation, Santa Clara, CA (US)

(72) Inventors: Madhu Swarna, Portland, OR (US); Jinghua Jiang, Portland, OR (US)

(73) Assignee: NVIDIA CORPORATION, Santa Clara, CA (US)

( * ) Notice: Subject to any disclaimer, the term of this patent is extended or adjusted under 35 U.S.C. 154(b) by 126 days.

(21) Appl. No.: 13/918,725

(22) Filed: Jun. 14, 2013

(65) Prior Publication Data

US 2014/0372796 A1   Dec. 18, 2014

(51) Int. Cl.
  *G06F 11/00* (2006.01)
  *G06F 11/14* (2006.01)
  *G06F 9/38* (2006.01)

(52) U.S. Cl.
  CPC .............. *G06F 11/1456* (2013.01); *G06F 9/38* (2013.01); *G06F 9/3842* (2013.01); *G06F 9/3863* (2013.01)

(58) Field of Classification Search
  CPC ............ G06F 11/1456; G06F 11/1471; G06F 11/1438; G06F 11/1469; G06F 11/1435
  USPC .......................................................... 714/15
  See application file for complete search history.

(56) References Cited

U.S. PATENT DOCUMENTS

| | | | |
|---|---|---|---|
| 6,105,148 A * | 8/2000 | Chung et al. ................... | 714/16 |
| 7,925,923 B1 | 4/2011 | Hyster et al. | |
| 2004/0128448 A1 * | 7/2004 | Stark ................... | G06F 12/0897 711/137 |
| 2008/0016325 A1 * | 1/2008 | Laudon ................. | G06F 9/3012 712/217 |
| 2010/0319000 A1 * | 12/2010 | Jones .................... | G06F 9/4411 718/108 |
| 2013/0297911 A1 * | 11/2013 | Rozas .................. | G06F 9/3802 712/205 |
| 2014/0136891 A1 * | 5/2014 | Holmer ............... | G06F 11/0763 714/15 |
| 2014/0164738 A1 * | 6/2014 | Ekman ...................... | G06F 9/30 712/205 |

FOREIGN PATENT DOCUMENTS

| | | |
|---|---|---|
| TW | I232372 | 5/2005 |
| TW | I315846 | 10/2009 |
| TW | 201220183 | 5/2012 |

OTHER PUBLICATIONS wikipedia "context switch" page, retrieved using the way back machine from address:https://web.archive.org/web/20130425000251/http://en.wikipedia.org/wiki/Context_switch.*
wikipedia "call stack" page, retrieved usingthe way back machine from https://web.archive.org/web/20120209054041/http://en.wikipedia.org/wiki/Stack_pointer.*

* cited by examiner

*Primary Examiner* — Yair Leibovich

(57) ABSTRACT

Various embodiments relating to saving and recovering a hardware architecture state are provided. In one embodiment, during a first mode of operation, entries in a first portion of a random-access memory (RAM) are manipulated. A current version of less than all of the entries of the first portion is saved to a checkpointed version in response to a checkpoint event that triggers operation in a second mode of operation. During the second mode of operation, entries in a second portion of the RAM are manipulated. The checkpointed version of less than all of the entries of the first portion is recovered as the current version in response to a restore event that triggers resumption of operation in the first mode.

19 Claims, 7 Drawing Sheets

CHECKPOINTING A COMPUTER HARDWARE ARCHITECTURE STATE USING A STACK OR QUEUE

BACKGROUND

Various structures may be implemented in a computing system to checkpoint and recover a computer hardware architecture state throughout operation. Non-limiting examples of such structures may include a register file, a return stack, a dispatch queue, etc.

In one example, a computer hardware architecture state may be checkpointed upon entering a runahead mode of execution. In particular, during a runahead mode, speculative execution of instructions may cause an incorrect set of instructions to complete, and incorrectly update a computer hardware architecture state. Accordingly, a mechanism may be used to restore the hardware architecture state to an accurate pre-speculation state upon exiting the runahead mode.

In one example, a register file is used to checkpoint the computer hardware architecture state. The register file may be implemented as an array with a checkpointed bit for every functional bit. The register file may include control signals to indicate when to copy the functional bits to and recover from the checkpointed bits. For example, before entering the runahead mode, a 'checkpoint' control signal may be asserted to copy every functional bit (i.e., the contents of the register file) into a corresponding checkpointed bit. Similarly, upon exit from the runahead mode, a 'recover' signal may be asserted to copy every checkpointed bit back to the corresponding functional bit.

However, the above described register file implementation has some issues. For example, the register file is implemented by way of a customized static random access memory (RAM) having additional ports to accommodate the checkpoint and recover control signals as well as additional control logic necessary to implement the checkpoint and recover functionality. The customized RAM (a.k.a., the checkpointed RAM) may be more complex and costly to employ in a CPU relative to a RAM (a.k.a., a non-checkpointed RAM) that does not have additional ports and control logic integrated into it.

Furthermore, since all functional bits of the register file are copied to checkpointed bits upon entering the runahead mode and all checkpointed bits are restored to functional bits upon exiting the runahead mode, a substantial current draw and localized voltage drops may be incurred during each copy operation. Note that these issues may occur with any checkpointed structure that is implemented in this manner (i.e., an en-masse copy of bits). Accordingly, the power electronics of the CPU may have to be increased to accommodate such variations in power. The larger power electronics may consume more power relative to power electronics for a non-checkpointed RAM.

DETAILED DESCRIPTION

Figure 1:
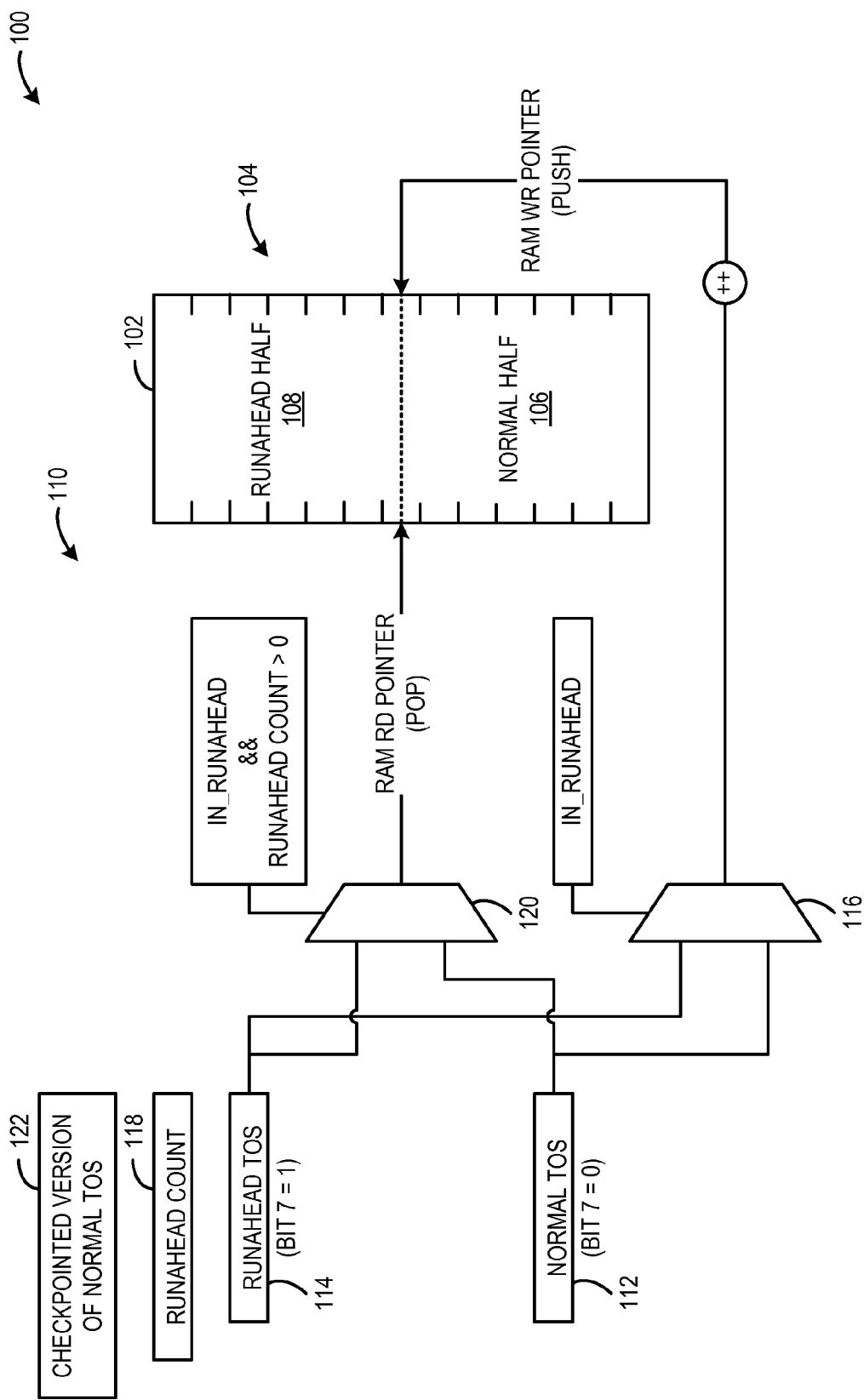
FIG. 1 schematically shows a non-checkpointed random access memory (RAM) used to implement a checkpointed data structure for saving and restoring a computer hardware architecture state according to an embodiment of the present disclosure.

The present disclosure relates to mechanisms for saving and recovering a computer hardware architecture state (referred to hereinafter as the "architecture state"). For example, an architecture state may be saved and recovered in a checkpointed data structure at entry and exit of a runahead mode of operation, respectively. More particularly, the present disclosure relates to methods and systems for implementing the checkpointed data structure using a traditional non-checkpointed random-access memory (RAM). The non-checkpointed RAM may not have additional control logic necessary to implement checkpoint and recover functionality for every bit of the RAM, such as would be required for a checkpointed register file. Accordingly, the non-checkpointed RAM may be easier to implement than the checkpointed RAM.

Since the non-checkpointed RAM does not offer save and recover functionality via integrated control logic, such functionality may instead be provided via manipulation of the checkpointed data structure implemented on the non-checkpointed RAM. Such manipulation may be applicable to checkpointing a subset of certain hardware structures. In particular, the checkpointed data structure may be manipulated such that less than all entries of the checkpointed data structure may be saved and recovered when switching between different modes of operation in order to maintain an accurate architecture state. By saving and recovering less than all entries, variations in power and general power consumption may be reduced relative to an approach that copies all bits. Accordingly, smaller and more energy efficient power electronics may be implemented with the non-checkpointed RAM.

In one example, a non-checkpointed RAM may be implemented as a stack, and the stack may be manipulated to act as the checkpointed data structure. In particular, the non-checkpointed RAM may include a plurality of entries divided into a normal stack and a runahead stack. Each stack may be configured to support push and pop operations to manipulate entries in the each of the stacks.

During a normal mode of execution of instructions, entries of the normal stack may be manipulated via push and pop operations without manipulating entries of the runahead stack. In order to preserve the architecture state, at the time of entering a runahead mode, a current version of a top-of-stack (TOS) pointer of the normal stack may be saved to a checkpointed version. During the runahead mode of speculative execution of instructions, entries of the runahead stack may be manipulated via push and pop operations without manipulating entries of the normal stack. At the time of exiting the runahead mode, the checkpointed version of the TOS pointer of the normal stack may be recovered to a current working copy of the TOS pointer, and operation in the normal mode may be resumed. Since the entries of the normal stack are not manipulated during runahead mode, only the TOS pointer of the normal stack needs to be checkpointed and restored in order to preserve the architecture state.

In another example, a non-checkpointed RAM may be implemented as a queue, and the queue may be manipulated to act as the checkpointed data structure. In particular, the non-checkpointed RAM may include a plurality of entries divided into a normal queue and a runahead queue. Each queue may be configured to support first-in-first-out (FIFO)

operations to manipulate entries in the each of the queues. Like the stack implementation, entries of the normal queue may be manipulated during operation in the normal mode without manipulating entries of the runahead queue. Further, entries of the runahead queue may be manipulated during operation in the runahead mode without manipulating entries of the normal queue. In order to preserve the architecture state, at the time of entering the runahead mode, current versions of a head-of-queue (HOQ) pointer and a tail-of-queue (TOQ) pointer of the normal queue may be saved to checkpointed versions. Furthermore, at the time of exiting the runahead mode, the checkpointed versions may be recovered to working copies of the HOQ and TOQ pointers, and operation in the normal mode may be resumed.

It is to be understood that such an approach may not be applicable to all hardware structures. For example, the approach may not be applicable to a register file that requires random access to any single entry as part of an en-masse copy operation of all entries.

FIG. 1 schematically shows a block diagram of a computer hardware architecture 100 including a non-checkpointed RAM 102 (referred to hereinafter as "RAM"). The RAM may be used to implement a checkpointed data structure for saving and restoring the architecture state (or a micro-architecture state). In the illustrated embodiment, the checkpointed data structure includes stack data structures. More particularly, the stacks are a return stack configured to store pointers to return addresses of function calls. Such function calls may be made during execution of instructions during the normal mode of operation or during speculative execution of instructions in the runahead mode of operation.

The RAM 102 may include a plurality of entries 104 divided into a first portion 106 and a second portion 108. In one particular example, the RAM is 128 entries that are organized into a normal stack including 64 entries reserved for use during operation in the normal mode and a runahead stack including 64 entries reserved for use during operation in the runahead mode. The RAM may not include functionality to checkpoint and restore every entry of the RAM.

The normal stack includes a normal TOS pointer 112 that points to a top entry of the normal stack, and the runahead stack includes a runahead TOS pointer 114 that points to a top entry of the runahead stack. In the example where the RAM includes 128 entries, each TOS pointer may include 7 flip flops to accommodate any of the possible entries of the RAM.

The hardware architecture 100 may include control logic 110 configured to manipulate entries of the RAM, and more particularly the normal stack and the runahead stack. In particular, the control logic may be configured to perform push and pop operations on either the normal stack or the runahead stack depending on the current mode of operation.

For a push operation, a multiplexor 116 may receive the normal TOS pointer and the runahead TOS pointer as inputs, and an operating mode signal that toggles between the normal mode and the runahead mode as a select line. The multiplexor may be configured to select the normal TOS pointer as a current version of a TOS pointer for the push operation when the select line indicates operation in the normal mode. On the other hand, the multiplexor may be configured to select the runahead TOS pointer as a current version of the TOS pointer for the push operation when the select line indicates operation in the runahead mode. Once the current version of the TOS pointer is selected for the appropriate operating mode, the push operation is performed on the appropriate stack. In particular, the push operation may include incrementing the current version of the TOS pointer by 1, then writing the data (e.g., a pointer to a return address) to the current TOS entry of the appropriate stack of the RAM.

Furthermore, a runahead count 118 may be configured to track a number of valid entries present in the runahead stack. In the example where the RAM includes 128 entries, the runahead count may include 7 flip flops to accommodate any of the possible entries of the RAM. During the runahead mode, a push operation may further include incrementing the runahead count by 1 after the data is written to the TOS entry of the runahead stack. The runahead count may not be manipulated during operation in the normal mode. It is to be understood that upon entering runahead mode, the entries of the runahead stack are zeroed to establish a clean slate of valid entries. In other words, entries in the runahead stack do not persist between runahead episodes.

For a pop operation, a multiplexor 120 may receive the normal TOS pointer and the runahead TOS pointer as inputs. The select line of the multiplexor may receive a Boolean expression indicating that the runahead TOS pointer is selected as the current version of the TOP pointer, if the operating mode signal is toggled to the runahead mode and the runahead count is greater than zero. In the other words, the multiplexor may be configured to select the normal TOS pointer as the current version of the TOS pointer for the pop operation during operation in the normal mode, or during operation in the runahead mode when there are no valid entries in the runahead stack. On the other hand, the multiplexor may be configured to select the runahead TOS pointer as the current versions of the TOS pointer for the pop operation during runahead mode when there is at least one valid entry in the runahead stack. Once the current version of the TOS pointer is selected for the appropriate operating mode, the pop operation is performed on the appropriate stack. In particular, the pop operation may include returning the data from the current TOS entry of the appropriate stack of the RAM, then decrementing the current TOS pointer by 1. Further, the pop operation may include decrementing the runahead count by 1 when applicable.

During operation in the runahead mode, speculative execution of instructions may cause inaccurate pop operations to be performed on an empty runahead stack. Since the goal of operation in the runahead mode is to generate instruction pre-fetches by detecting cache misses before they would otherwise occur, the inaccurate instructions are permitted to be executed. Accordingly, when a pop operation is performed on an empty runahead stack, the zeroed runahead count causes data in the TOS entry of the normal stack to be returned in order to complete the instruction. Although the TOS entry from the normal stack is returned, the data in the TOS entry is not modified by the pop operation. In other words, entries of the normal stack are not manipulated during the runahead mode.

When instructions are being executed in the normal mode, only the normal stack is active. In other words, all push and pop operations manipulate the entries in the normal stack without manipulating entries in the runahead stack. Furthermore, the current version of the TOS pointer of the normal stack is incremented or decremented according to the push or pop operations being executed.

When instructions are being speculatively executed in the runahead mode, only the runahead stack is active. In other words, all push and pop operations manipulate entries in the runahead stack without manipulating entries in the normal stack. Although data from the normal stack may be returned by a pop operation during operation in the runahead mode (e.g., when the runahead stack is empty), it is to be understood that neither the data nor the entry is manipulated by the pop operation. Accordingly, the normal stack remains unchanged by operation in the runahead mode.

At the time of entering the runahead mode the TOS pointer of the normal half may be backed up to a checkpointed version 122. At the time of exiting the runahead mode, the checkpointed version of the TOS pointer may be copied back to the working copy of the TOS pointer of the normal stack and execution in the normal mode may be resumed. Since the normal stack remains unchanged during operation in the runahead mode, the TOS pointer of the normal stack is the only thing that needs to be checkpointed in order to preserve the architecture state.

It is to be understood that the above described hardware architecture may be implemented to preserve an architecture state of any suitable computing system. For example, the hardware architecture may be implemented on-board a CPU of a microprocessor to preserve a state of the CPU. In another example, the hardware architecture may be implemented on-board a GPU to preserve a state of the GPU. In another example, the hardware architecture may be implemented on-board an embedded microcontroller to preserve a state of the microcontroller.

Although the above described hardware architecture is discussed in the context of normal and runahead operating modes, it is to be understood that the above described mechanisms are broadly applicable to saving and recovering an architecture state in response to any suitable checkpoint and recover events. Moreover, the architecture state may be saved and recovered in response switching between any suitable modes of operation, as well as switching between any suitable number of modes of operation.

It is to be understood that the RAM may be used to implement any suitable checkpointed data structure for saving and restoring an architecture state. Furthermore, it is to be understood that the first portion and the second portion of the RAM may be divided into any suitable number of entries. For example, the first portion may include more entries than the second portion or vice versa.

Figure 2:
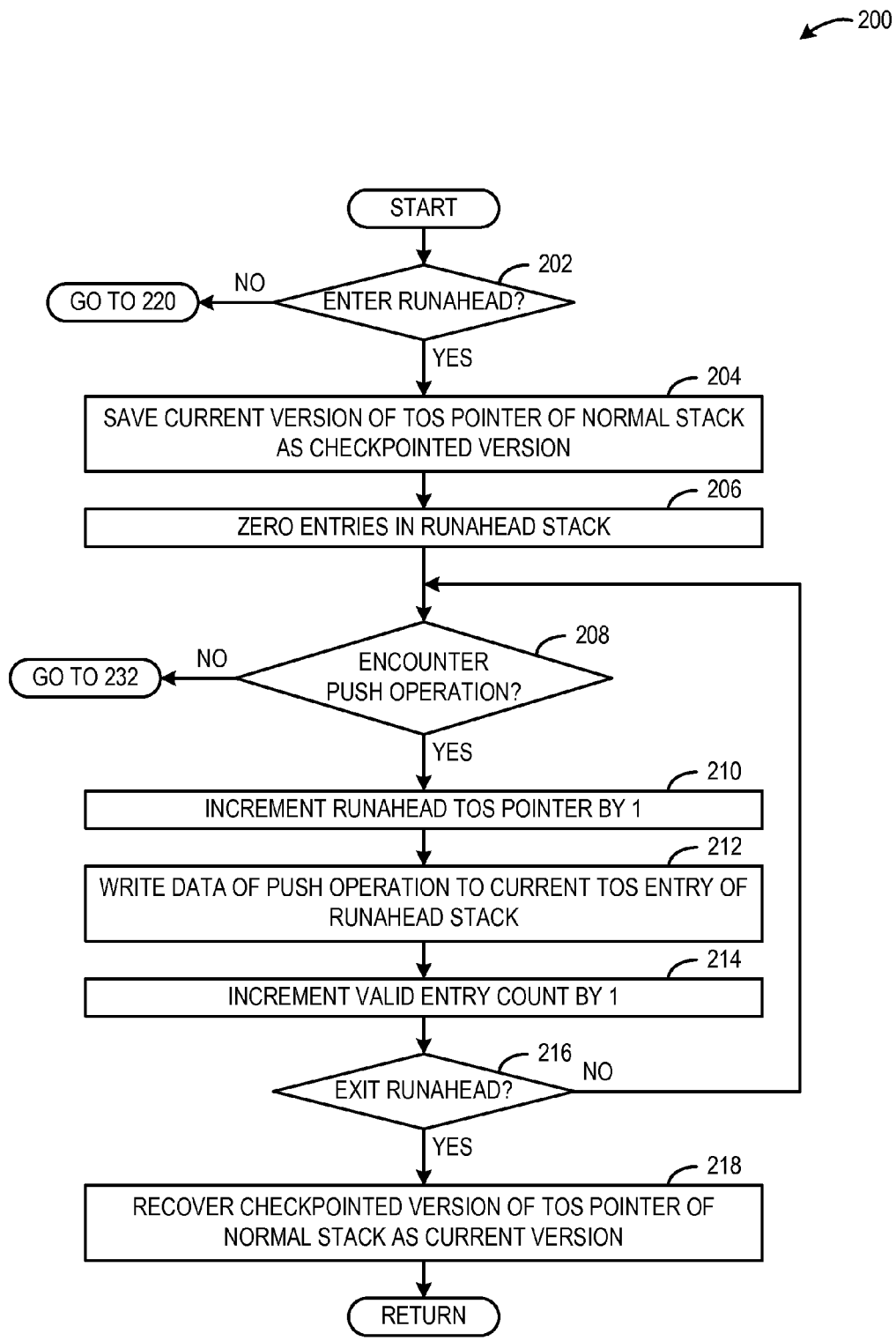
FIGS. 2-4 show a method for saving and recovering a computer hardware architecture state according to an embodiment of the present disclosure.
Figure 3:
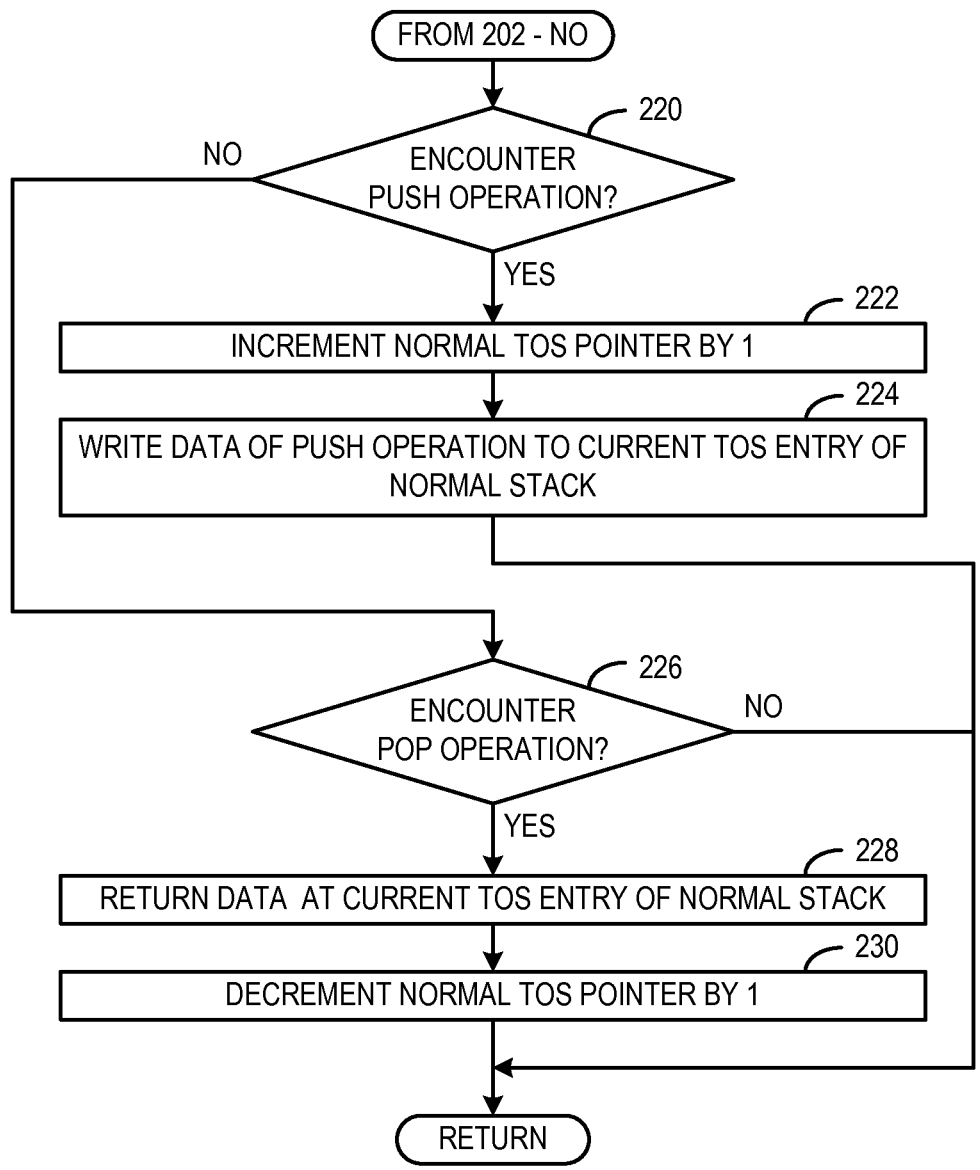
Figure 4:
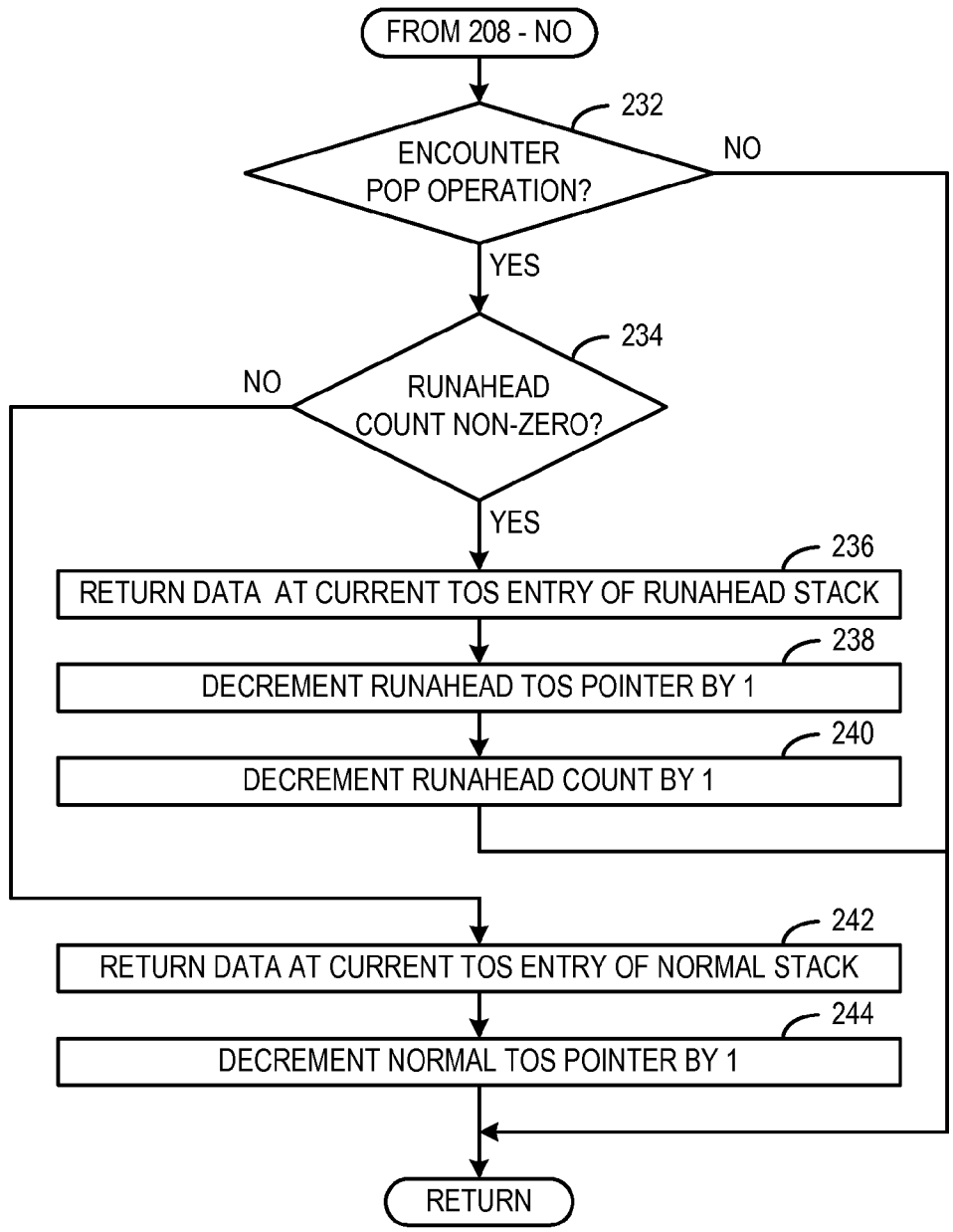

FIGS. 2-4 show a method 200 for saving and recovering an architecture state according to an embodiment of the present disclosure. For example, the method 200 may be performed by the hardware architecture 100 shown in FIG. 1.

At 202, the method 200 may include determining whether operation is entering into the runahead mode. For example, a checkpoint event, such as an instruction cache load miss, may trigger operation in the runahead mode. If operation enters the runahead mode, then the method 200 moves to 204. Otherwise, the method 200 moves to 220.

At 204, the method 200 may include saving the current version of the TOS pointer of the normal stack to the checkpointed version.

At 206, the method 200 may include zeroing the entries in the runahead stack.

At 208, the method 200 may include determining whether a push operation is encountered during operation in the runahead mode. If a push operation is encountered, then the method 200 moves to 210. Otherwise, the method 200 moves to 230.

At 210, the method 200 may include incrementing the TOS pointer of the runahead stack by 1.

At 212, the method 200 may include writing the data of the push operation to the current TOS entry of the runahead stack as indicated by the TOS pointer of the runahead stack. In one example, the data is a pointer to a return address of a function call.

At 214, the method 200 may include incrementing the runahead counter by 1.

At 216, the method 200 may include determining whether operation is exiting runahead. For example, a recover event, such as an instruction cache load miss being resolved, may trigger resumption of operation in the normal mode. If operation exits the runahead mode, then the method 200 moves to 218. Otherwise, the method 200 returns to 208.

At 218, the method 200 may include recovering the checkpointed version of the TOS pointer of the normal stack as the current version of the TOS pointer.

At 220, the method 200 may include determining whether a push operation is encountered during operation in the normal mode. If a push operation is encountered, then the method 200 moves to 222. Otherwise, the method 200 moves to 226.

At 222, the method 200 may include incrementing the TOS pointer of the normal stack by 1.

At 224, the method 200 may include writing the data of the push operation to the current TOS entry of the normal stack as indicated by the TOS pointer of the normal stack. In one example, the data is a pointer to a return address of a function call.

At 226, the method 200 may include determining whether a pop operation is encountered during operation in the normal mode. If a pop operation is encountered, then the method 200 moves to 228. Otherwise, the method 200 returns to other operations.

At 228, the method 200 may include returning data at the current TOS entry of the normal stack as indicated by the TOS pointer of the normal stack.

At 230, the method 200 may include decrementing the TOS pointer of the normal stack by 1.

At 232, the method 200 may include determining whether a pop operation is encountered during operation in the runahead mode. If a pop operation is encountered, then the method 200 moves to 234. Otherwise, the method 200 returns to other operations.

At 234, the method 200 may include determining whether the runahead count of valid entries in the runahead stack is non-zero. If the runahead count is non-zero, then the method 200 moves to 236. Otherwise, the method 200 moves to 242.

At 236, the method 200 may include returning data at the current TOS entry of the runahead stack as indicated by the TOS pointer of the runahead stack.

At 238, the method 200 may include decrementing the TOS pointer of the runahead stack by 1.

At 240, the method 200 may include decrementing the runahead count by 1.

At 242, the method 200 may include returning data at the current TOS entry of the normal stack as indicated by the TOS pointer of the normal stack.

At 244, the method may include decrementing the TOS pointer of the normal stack by 1.

The above described method may be performed to save and recover an architecture state using a non-checkpointed RAM divided into a normal stack and a runahead stack. In particular, during the normal mode, entries of the normal stack may be manipulated via push and pop operations without manipulating entries of the runahead stack. Similarly, during the runahead mode, entries of the runahead stack may be manipulated via push and pop operation without manipulating entries of the normal stack. Furthermore, a current version of the TOS pointer that points to a top entry of the normal stack may be saved to a checkpointed version in response to entering the runahead mode. Correspondingly, the checkpointed version of the TOS pointer may be recovered to the current version in response to exiting the runahead mode. Accordingly, the entire architecture state may be preserved during operation in the runahead mode by only having to copy a single entry (e.g., the TOS pointer of the normal stack) as opposed to having to copy every entry of a RAM. In this way, the architecture state may be saved and recovered in a manner than employs less complex components and consumes less power relative to a register file implemented using a checkpointed RAM.

It is to be understood that the above described method may be broadly applicable to any suitable checkpointed data structure. For example, the method may be performed in a similar manner by a hardware architecture that includes a normal queue and a runahead queue implemented on a non-checkpointed RAM.

It will be appreciated that methods described herein are provided for illustrative purposes only and are not intended to be limiting. Accordingly, it will be appreciated that in some embodiments the methods described herein may include additional or alternative processes, while in some embodiments, the methods described herein may include some processes that may be reordered, performed in parallel or omitted without departing from the scope of the present disclosure. Further, it will be appreciated that the methods described herein may be performed using any suitable software and hardware in addition to or instead of the specific examples described herein.

FIGS. 5-12 schematically show example operation of a checkpointed stack data structure 500 according to an embodiment of the present disclosure. The checkpointed stack data structure includes a normal stack 502 and a runahead stack 504.

Figure 5:
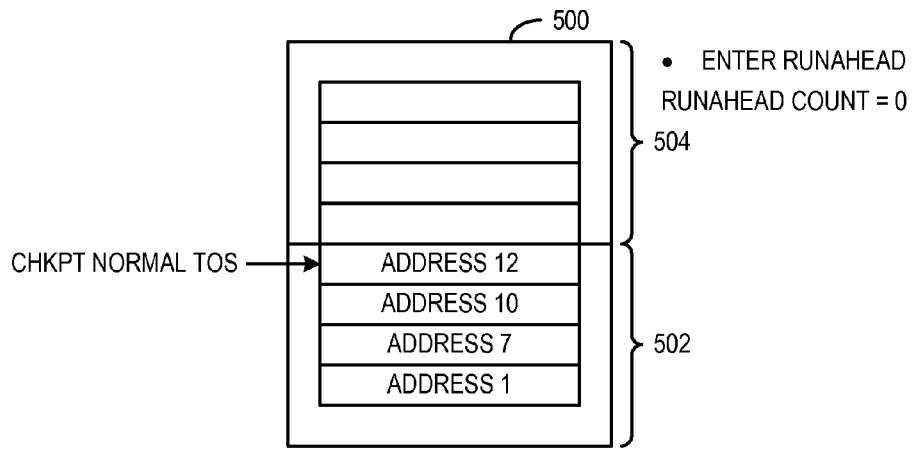
FIGS. 5-12 schematically show example operation of a checkpointed stack data structure according to an embodiment of the present disclosure.

In FIG. 5, operation is entering the runahead mode. The normal stack includes a plurality of entries that have been pushed onto the stack. In particular, the entries include pointers to return addresses of function calls. In response to entering the runahead mode, a current version of the TOS pointer of the normal stack is saved as a checkpointed version, the entries of the runahead stack are zeroed, and the runahead count of valid entries in the runahead stack is zero.

Figure 6:
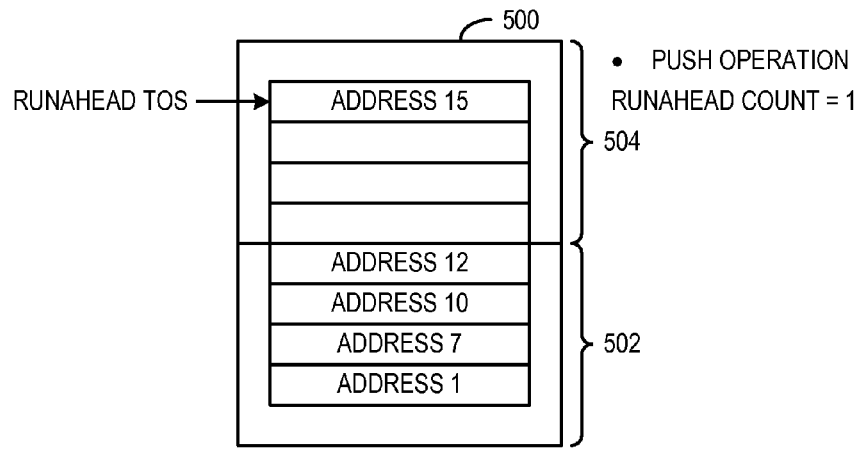

In FIG. 6, a push operation is performed. Since operation is in runahead mode, the TOS pointer of the runahead stack is incremented to point to the TOS entry of the runahead stack. Data of the push operation is written to the TOS entry of the runahead stack as indicated by the TOS pointer of the runahead stack. The runahead count is incremented to 1 by the push operation.

Figure 7:
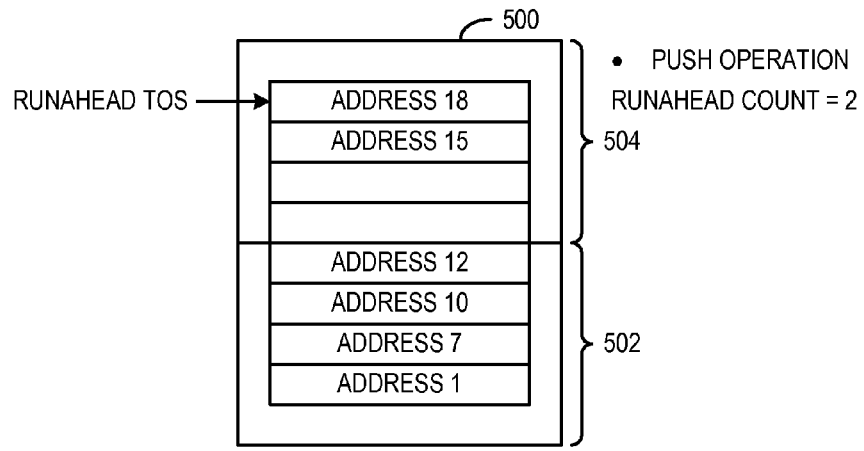

In FIG. 7, another push operation is performed to write data to a TOS entry of the runahead stack. Since operation is in runahead mode, the TOS pointer of the runahead stack is incremented to point to the TOS entry of the runahead stack. Data of the push operation is written to the TOS entry of the runahead stack as indicated by the TOS pointer of the runahead stack. The runahead count is incremented to 2 by the push operation.

Figure 8:
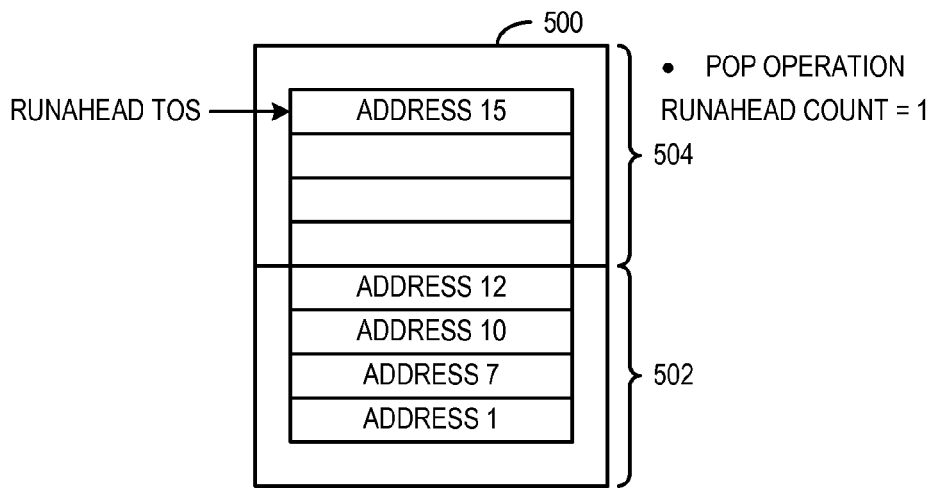

In FIG. 8, a pop operation is performed. Since the runahead count is non-zero and operation is in the runahead mode, the data at the TOS entry of the runahead stack is read, and the data is removed from the runahead stack. The TOS pointer of the runahead stack is decremented to point to the current TOS entry of the runahead stack. The runahead count is decremented to 1 by the pop operation.

Figure 9:
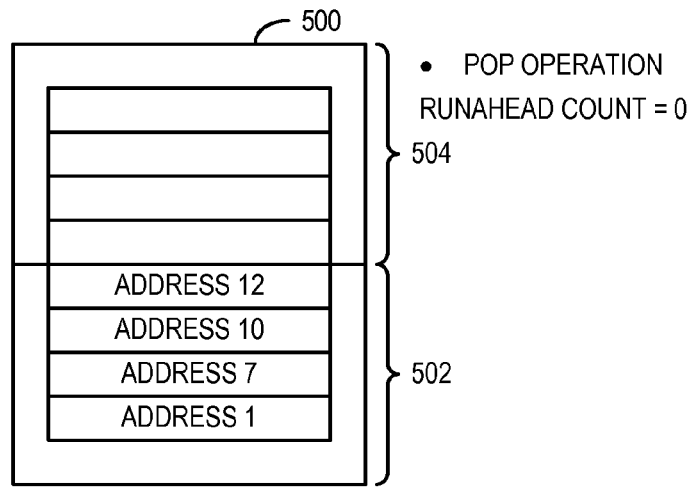

In FIG. 9, another pop operation is performed. Since the runahead count is non-zero and operation is in the runahead mode, the data at the TOS entry of the runahead stack is read, and the data is removed from the runahead stack. The TOS pointer of the runahead stack is decremented to null since the runahead stack is empty. The runahead count is decremented to zero by the pop operation.

Figure 10:
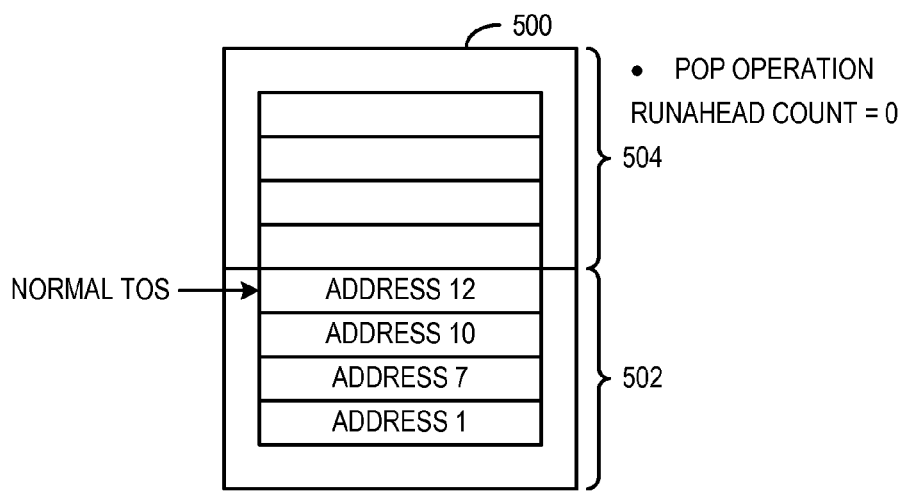

In FIG. 10, another pop operation is performed. Since the runahead count is zero and operation is in the runahead mode, the data at the TOS entry of the normal stack is read, and the data is not removed or otherwise manipulated from the normal stack. The TOS entry of the normal stack is decremented by the pop operation.

Figure 11:
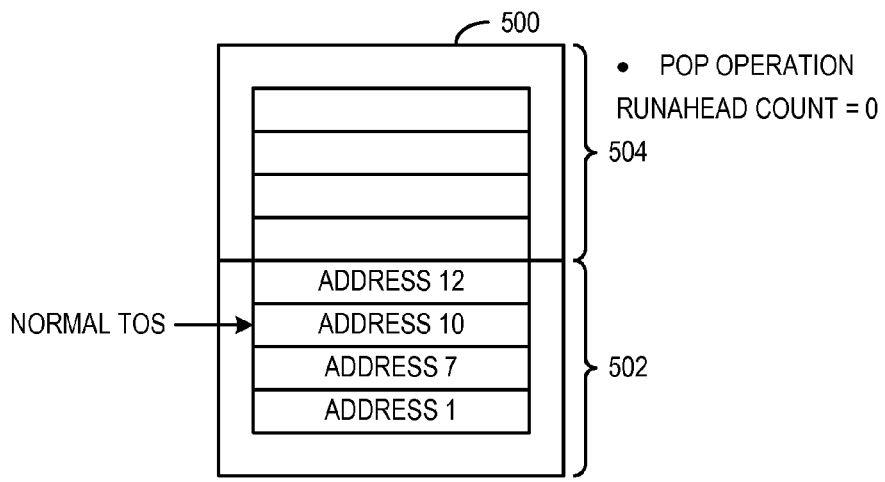

In FIG. 11, another pop operation is performed. Since the runahead count is zero and operation is in the runahead mode, the data at the entry of the normal stack pointed to by the TOS pointer of the normal stack is read, and the data is not removed or otherwise manipulated from the normal stack. In this case, the entry is the second entry from the top of the stack. The TOS entry of the normal stack is decremented by the pop operation.

Figure 12:
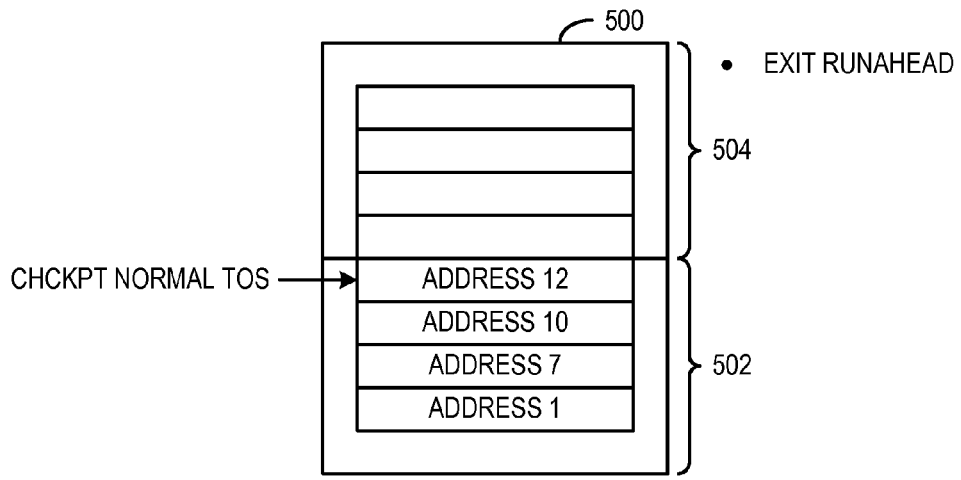

In FIG. 12, operation is exiting runahead. The checkpointed version of the TOS pointer of the normal stack is recovered as the current version of the TOS pointer of the normal stack in response to exiting the runahead mode. Once the TOS pointer of the normal stack is recovered, operation in the normal mode is resumed.

Figure 13:
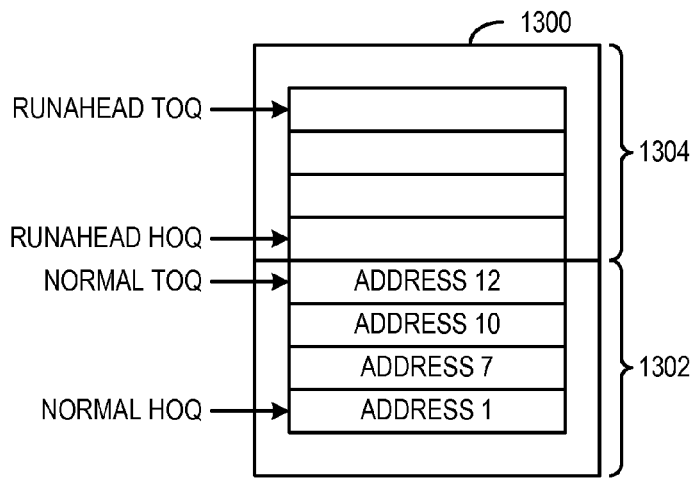
FIG. 13 schematically shows a checkpointed queue data structure according to an embodiment of the present disclosure.

FIG. 13 schematically shows a checkpointed queue data structure 1300 according to an embodiment of the present disclosure. The checkpointed queue data structure includes a normal queue 1302 and a runahead queue 1304. The normal queue may include a HOQ pointer that points to a first or head entry of the normal queue and a TOQ pointer that points to a last or tail entry of the normal queue. The runahead queue may include a HOQ pointer that points to a first or head entry of the runahead queue and a TOQ pointer that points to a last or tail entry of the runahead queue. The queue data structure may be manipulated to save and recover an architecture state in a similar manner to the stack data structure described above. However, the HOQ pointer and the TOQ pointer of the normal queue may be saved as checkpointed versions in response to entering the runahead mode and the checkpointed versions may be recovered as current version in response to exiting the runahead mode.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples as understood by those of ordinary skill in the art. Such other examples are intended to be within the scope of the claims.

The invention claimed is:

1. A method for saving and recovering a hardware architecture state using a random-access memory (RAM) including a plurality of entries divided into a first portion and a second portion, the method comprising:
    during a first mode of operation, manipulating entries in the first portion, where the first mode is a normal mode for execution of instructions;
    saving a current version of less than all of the entries of the first portion to a checkpointed version in response to a checkpoint event that triggers operation in a second mode of operation, where the second mode is a runahead mode for speculative execution of instructions;
    upon entering the second mode of operation, zeroing entries in the second portion;
    during the second mode of operation, manipulating entries in the second portion; and
    recovering the checkpointed version of less than all of the entries of the first portion as the current version in response to a recover event that triggers resumption of operation in the first mode.

2. The method of claim 1, where saving the current version includes saving a single entry of the first portion to preserve a state of the entire first portion.

3. The method of claim 1, where the first portion is organized into a first stack and the second portion is organized into a second stack.

4. The method of claim 3, where the current version of less than all of the entries of the first portion is a top-of-stack pointer that points to a top entry of the first stack.

5. The method of claim 4, where the first stack and the second stack are return stacks that store pointers to return addresses of function calls.

6. The method of claim 1, where the first portion is organized into a first queue and the second portion is organized into a second queue.

7. The method of claim 6, where the current version of less than all of the entries of the first portion includes a head-of-queue pointer that points to a first entry in the first queue and a tail-of-queue pointer that points to a last entry of the first queue.

8. The method of claim 1, where during the first mode, the entries of the second portion are not manipulated and during the second mode, the entries of the first portion are not manipulated.

9. A method for saving and recovering a hardware architecture state using a random-access memory (RAM) including a plurality of entries divided into a normal portion and a runahead portion, the method comprising:
   during a normal mode of execution of instructions, manipulating entries of the normal portion without manipulating entries of the runahead portion;
   saving a current version of a pointer that points to an entry of the normal portion to a checkpointed version to preserve a state of the normal portion in response to entering a runahead mode of speculative execution of instructions;
   upon entering the runahead mode, zeroing entries in the runahead portion;
   during operation in the runahead mode, manipulating entries of the runahead portion without manipulating entries of the normal portion; and
   recovering the checkpointed version of the pointer as the current version in response to exiting the runahead mode.

10. The method of claim 9, where the normal portion is organized into a first stack and the runahead portion is organized into a second stack.

11. The method of claim 10, where the pointer is a top-of-stack pointer that points to a top entry of the first stack.

12. The method of claim 10, where the first stack and the second stack are return stacks that store pointers to return addresses of function calls of instructions.

13. The method of claim 9, where the normal portion is organized into a first queue and the runahead portion is organized into a second queue.

14. The method of claim 13, where the pointer is a head-of-queue pointer that points to a first entry in the first queue and the method further comprises: saving a current version of a tail-of-queue pointer that points to a last entry of the first queue to a checkpointed version of the tail-of-queue pointer in response to entering the runahead mode; and recovering the checkpointed version of the tail-of-queue pointer as the current version in response to exiting runahead mode.

15. The method of claim 9, wherein the normal portion includes a first half of the plurality of entries of the RAM and the runahead portion includes a second half of the plurality of entries of the RAM.

16. A method for saving and recovering a hardware architecture state using a random-access memory (RAM) including a plurality of entries divided into a normal stack and a runahead stack, the method comprising:
   during a normal mode of execution of instructions, manipulating entries of the normal stack without manipulating entries of the runahead stack;
   saving a current version of a top-of-stack pointer that points to a top entry of the normal stack to a checkpointed version in response to entering a runahead mode of speculative execution of instructions;
   upon entering the runahead mode, zeroing entries in the runahead stack;
   during the runahead mode, manipulating entries of the runahead stack without manipulating entries of the normal stack; and
   recovering the checkpointed version of the top-of-stack pointer as the current version in response to exiting the runahead mode.

17. The method of claim 16, wherein during the runahead mode, manipulating includes performing a push operation including incrementing a top-of-stack pointer of the runahead stack, writing a return address pointer into an entry of the runahead stack corresponding to the top-of-stack pointer of the runahead stack, and incrementing a runahead valid entry count.

18. The method of claim 16, wherein during the runahead mode, manipulating includes performing a pop operation including if a runahead valid entry count is non-zero, returning a top entry of the runahead stack corresponding to a top-of-stack pointer of the runahead stack, decrementing the top-of-stack pointer of the runahead stack, and decrementing the runahead valid entry count.

19. The method of claim 16, wherein during the runahead mode, manipulating includes performing a pop operation including if a runahead valid entry count is zero, returning a top entry of the normal stack corresponding to a top-of-stack pointer of the normal stack, and decrementing the top-of-stack pointer of the normal stack.

* * * * *